United States Patent [19]

Buffin

[11] Patent Number: 4,813,134
[45] Date of Patent: Mar. 21, 1989

[54] SHEET METAL PUNCHING AND CUTTING TOOL

[76] Inventor: Charles P. Buffin, 708 Gaulding Rd., Mechanicsville, Va. 23111

[21] Appl. No.: 7,184

[22] Filed: Jan. 27, 1987

[51] Int. Cl.$^4$ ............................................. B26F 1/18
[52] U.S. Cl. .................................... 30/294; 30/167.2; 30/168; 30/277; 30/367
[58] Field of Search ............... 30/1, 2, 167, 167.1, 30/167.2, 164.6, 164.7, 277, 294, 314, 367, 368, 443, 444, 449, 168; 81/463; 7/156, 158, 163

[56] References Cited

U.S. PATENT DOCUMENTS

| | | | |
|---|---|---|---|
| 1,336,376 | 4/1920 | Philips | 30/294 X |
| 1,397,217 | 11/1921 | Kepner | 30/443 |
| 1,624,853 | 4/1927 | Winter | 30/168 |
| 2,199,380 | 5/1940 | Walraven | 30/168 |
| 2,255,196 | 9/1941 | Taylor | 30/294 |
| 2,465,305 | 3/1949 | Cope | 30/92.5 |
| 2,896,322 | 7/1959 | Vose | 30/168 |
| 3,118,226 | 1/1964 | Balz | 30/1 |

FOREIGN PATENT DOCUMENTS

| | | | |
|---|---|---|---|
| 175962 | 3/1917 | Canada | 30/294 |
| 410786 | 6/1945 | Italy | 30/294 |

*Primary Examiner*—E. R. Kazenske
*Assistant Examiner*—Michael D. Folkerts
*Attorney, Agent, or Firm*—Edward J. Kondracki

[57] ABSTRACT

A compact, easy-to-use sheet metal tool which is capable of receiving hammer blows and having a cutting element capable of penetrating the sheet metal to create a slot and to cut an extended slot in the sheet, the tool is further provided with a flat guide portion to facilitate proper orientation of the tool and to guide the tool along the surface of the sheet.

18 Claims, 1 Drawing Sheet

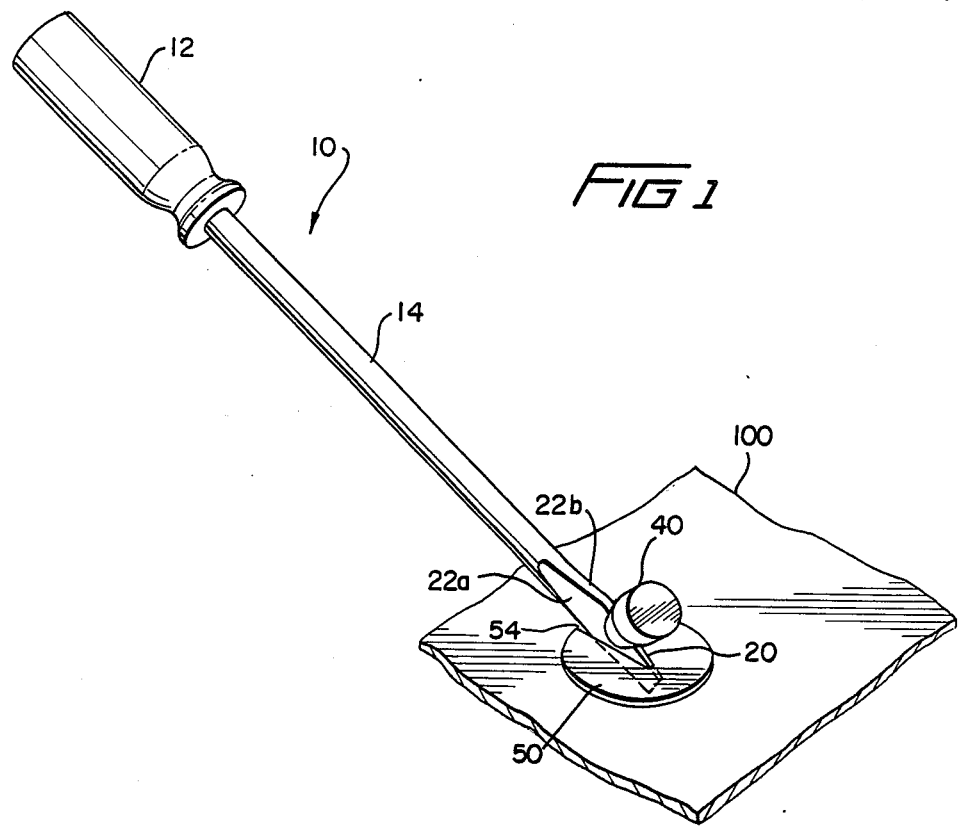
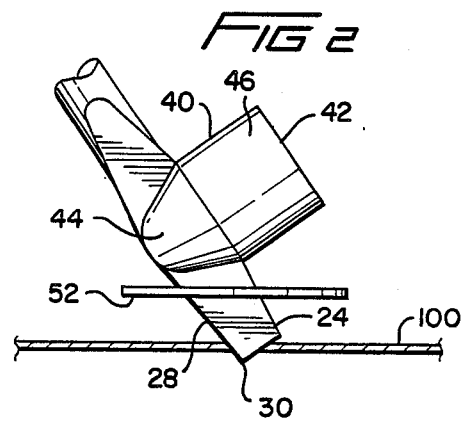
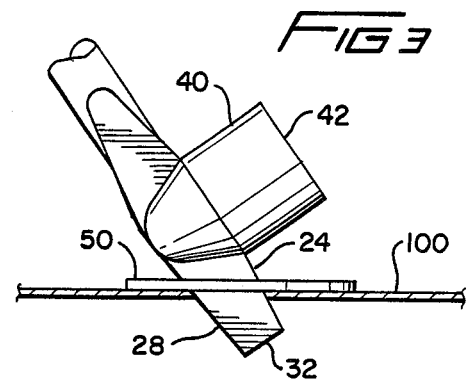
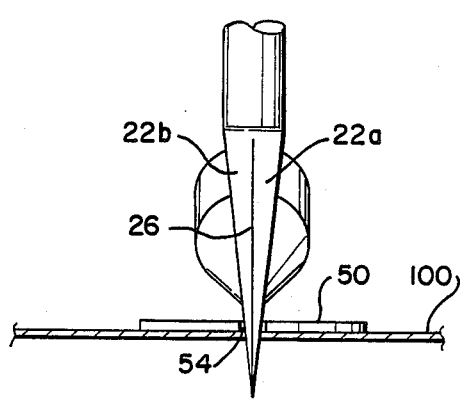
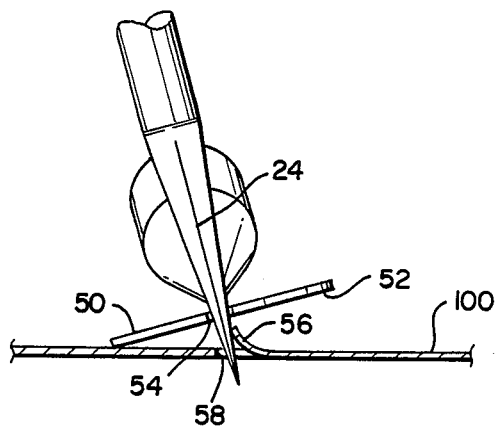

SHEET METAL PUNCHING AND CUTTING TOOL

BACKGROUND OF THE INVENTION

1. Field of the Invention

The present invention is related to sheet metal cutting tools, more specifically to hand-held punching and slot cutting tools.

2. Description of Related Art

Various tools have been developed in the sheet metal working art for punching holes in, or for cutting sheet metal, either by machine or by hand. One of the hand-held tools known in the art for cutting the lighter gauges of sheet metal is a scissors-type tool commonly referred to as "tin snips". Tin snips perform their intended function very efficiently, however their use is somewhat limited in that they cannot be used by themselves to make cuts which would be made entirely within the boundaries of the sheet to be cut. Cuts using tin snips must start at an edge of the sheet, as the tin snips are not usually capable of making an initial penetration into the sheet.

There are other sheet metal cutters known in the art which use the same general principle as the present invention, that is, providing a cutting blade and propelling it through the sheet metal by some sort of impact means. One popular means for providing impact is through a pneumatic compressed air system, which is cumbersome and expensive to use. Other hand held tools, relying on impact provided by a hammer or other similar tool are also known. These tools have generally been designed for specific purposes, such as making relatively ornate cuts in the sheet metal. The tools are thus not always suitable for other applications, can be cumbersome to use, and are likely to be relatively expensive compared to everyday hand tools such as hammers and the like.

SUMMARY OF THE INVENTION

The sheet metal tool of the present invention is an inexpensive, easy-to-use tool which can be used for cutting primarily lighter gauge sheet metals, and also for making starter slots on the surface of the sheet metal for subsequent cutting using tin snips.

The tool comprises a handle similar to one used on a screwdriver or other hand held tool of this type, a slender shaft extending away from the handle, a cutting element attached to the opposite end of the shaft having a cutting edge on a lower surface, a guide plate disposed at obtuse angle to the cutting edge, and a striking block where impact is to be imparted from a second tool such as a hammer.

The configuration of the tool makes it easy to use as both a cutting tool as well as a punching tool which will create a slot-shaped penetration on an interior portion of the sheet. By varying the orientation of the tool with the sheet metal, within the limits allowed by the guide plate of the tool, the force of the impact imparted by a second tool such as a hammer may be directed in a particular desired direction. Additionally, the tool of the present invention works effectively on the lighter gauge sheet metals by providing a guide plate with sufficient surface area to assist in distributing the force of the impact so as to prevent deformation in the area of the sheet metal adjacent to the slot being cut. Further, a notch is provided on the guide plate extending from the point directly adjacent to the cutting edge, and extending to the periphery of the tool along a line which the tool will be propelled by impact. Thus, in the event that any burrs or other surface imperfections are encountered in the cutting path, the notch will allow the cutting edge of the tool to advance to the burr and cut through it. The notch provides an additional feature in that it provides a sight line to the cutting edge, allowing the user to determine how far a cut has advanced.

It is an important object of the present invention to provide a versatile, inexpensive easy-to-use sheet metal cutting tool.

It is a further important object to provide a cutting tool which also can perform the function of creating a slot on a surface of the sheet which will allow a pair of tin snips to be inserted for further cutting.

It is a further important object to provide a cutting tool which is well-suited for use with the lighter gauges of sheet metal.

BRIEF DESCRIPTION OF THE DRAWINGS

The above and other important objects and features of the present invention will be more readily understood when the following detailed description is considered in conjunction with the accompanying drawings wherein like characters represent like parts throughout the several views and in which:

FIG. 1 shows a perspective view of the sheet metal tool according to a preferred embodiment of the present invention.

FIG. 2 shows a side view of the sheet metal tool of the present invention immediately after penetrating a piece of sheet metal.

FIG. 3 is a side view of the sheet metal tool of the present invention after a full penetration of the sheet metal has been effected.

FIG. 4 shows a rear view of the tool of the present invention at the full penetration position.

FIG. 5 shows a rear view of the tool of the present invention as the tool is being tilted from the perpendicular to raise a lip in the sheet metal.

DESCRIPTION OF THE PREFERRED EMBODIMENT

Referring initially to FIG. 1, a preferred embodiment of the sheet metal cutting tool of the present invention is referred to generally by numeral 10. At one end of tool 10 is handle 12, which is preferably of a diameter and length suitable for obtaining a firm grip by a human hand. Extending from handle 12 is an upper end of steel shaft 14, and it can be seen in FIG. 1 that these elements preferably share a common longitudinal axis. Because a hammer or some other relatively massive tool will be used to strike blows at the end of the shaft 14 opposite the handle 12, the shaft 14 should be of sufficient length to allow a user to grip the handle 12 at a safe and comfortable distance away from the area receiving the hammer blows.

Located at the lower end of shaft 14 opposite handle 12, is a cutting element 20. Cutting element 20 can be either a flattened, tapered extension of shaft 14 or can be fabricated separately and attached at the end of the shaft by weldment or other metal joining medium. Cutting element 20 preferably has the same longitudinal axis as shaft 14 and handle 12, although it may not be fully symmetrical about that axis.

The preferred orientation for the use of this tool is best described with reference to a horizontal plane which would eventually take the form of a piece of sheet metal 100 to be cut. The longitudinal axis of tool 10 be oriented at an oblique angle to the horizontal plane as shown in FIG. 2 and cutting element 20 is preferably maintained in a vertical orientation with respect to that plane or sheet 100 as shown in FIG. 4.

This orientation creates what will be considered as a top surface 24 and bottom surface 28 of cutting element 20 (FIG. 2). The side faces 22a, 22b of cutting element 20 are oriented substantially parallel to each other near top surface 24, but have a taper which creates cutting edge 26 (FIG. 4) at the lower surface 28 of cutting element 20. This cutting edge 26, when the tool is oriented for use, forms an acute angle with a top surface of the sheet metal to be cut. Lower surface 28 extends from the end of shaft 14 to tip 30 (FIG. 2). Front edge 32 (FIG. 3) intersects lower surface 28 at tip 30 in a substantially perpendicular manner, when viewed from the side as in FIG. 3. Front edge 32 has a narrow, wedge-like cross-section conforming to the taper of side faces 22a and 22b.

A guide plate 50 is provided to assist in maintaining the proper tool orientation, which results in more accurate and more efficient cutting. Guide plate 50 extends outwardly from cutting element 20, and has a substantially planar flat surface 52 on a lower side thereof. It is also preferred that a top surface of guide plate 50 be flat as well. The plane containing this lower flat surface is substantially perpendicular to a vertically oriented plane passing through the cutting edge 26 of cutting element 20, while also forming an obtuse angle with cutting edge 26 at the point where they intersect. Guide plate 50 is located a sufficient distance away from tip 30 to leave essentially the entire cutting edge 26 exposed below the lower side of the plate. Guide plate 50 also preferably contains a notch 54 which, as will be explained later, extends from the point where the plate intersects the cutting edge 26 out to the periphery of the plate.

A striking block or anvil 40 is attached to cutting element 20 above the upper side of guide plate 50. Striking block 40 preferably extends away from the top surface 24 of cutting element 20 along an axis perpendicular to the longitudinal axis of the tool 10, and is also preferably symmetrical about the vertical plane of cutting element 20. Striking block 40 has a solid cylindrical body terminating in a flat face 42 at one end, which may be slightly rounded at the edges, for receiving blows and absorbing the impact from a hammer or the like. Striking block 40 in the preferred embodiment has an essentially conical portion 44 at its other end attached to cutting element 20 and an essentially solid cylindrial portion 46 extending away from cutting element 26. The solid portion is of a large mass relative to the cutting element for absorbing impact blows of a hammer to the striking face 42. Face 42 is thus essentially circular and should be of a diameter sufficient to be easily struck by a hammer, that is, approximately the same or slightly smaller diameter as a conventional 16-ounce hammer.

Turning now to FIGS. 2 and 3, the tool is shown from the side in an initial penetration state and a full penetration state, respectively. The tool is held at the handle 12 by the user at these stages in the same manner as a conventional hand tool (not shown). When a cut in sheet metal 100 is desired which is not to be started at the perimeter of the sheet, a slot must be made by penetrating the sheet. This tool is especially well suited for this task. Initially, the tip 30 of the tool is brought into contact with sheet 100, which would be a position just prior to that shown in FIG. 2. While it is apparent that, in this position, guide plate 50 will not physically assist in maintaining a particular orientation, it is useful for visual verification of proper orientation. Generally, it is preferred to start with guide plate 50 being parallel to sheet 100 and to deliver a blow or blows to the face 42 of striking block 40 with a hammer held in the other hand. This will drive tip 30 downwardly and in a direction toward cutting edge 26, causing tip 30 to pierce sheet 100 and also cause cutting edge 26 and front edge 32 to begin to penetrate the sheet 100. In the event that more downward force is required, e.g. for penetration of thicker sheets, the orientation of the tool may be changed by rotation, through a limited range, in a counterclockwise direction using FIG. 2 for reference. This would rotate the face 42 of striking block 40 into a position more closely parallel to sheet 100, thereby translating more of the force imparted by the hammer blow in a downward direction. The sharp tip 30 will still be in contact with the sheet 100 to make the penetration. The range of rotation would be limited by the interference from the edge of guide plate 50 coming into contact with sheet 100.

After the initial penetration (FIG. 2) the cut may be lengthened if desired by imparting additional blows with the hammer on striking block 40, guiding the tool direction by hand. FIG. 3 shows the tool in a position where the entire cutting edge 26 has penetrated sheet 100. This is the preferred position for making long cuts because at this position the lower surface of guide plate 50 is in contact with sheet 100 and will ensure proper alignment of the tool. It will also keep the tool much steadier for receiving hammer blows, which will assist in obtaining straighter cuts.

It can best be seen after this description of the operation of the tool that the guide plate 50 is preferably of sufficient surface area to cause a wide distribution of the downward forces created by the hammer blows. This will provide a degree of protection in preventing deformation in the area surrounding the cut. If the guide plate were relatively small and the sheet were of a relatively light gauge, the guide plate could cause denting due to the downware force applied by the impacts.

An additional advantage to having a guide plate 50 with a relatively large surface area can be seen in FIGS. 4 and 5. One intended use for this tool is to start a slot on an interior of a piece of sheet metal so that a pair of tin snips can be inserted to continue and finish the cut. The guide plate, as shown in the change of position between FIG. 4 and FIG. 5, can be used as a lever to tilt cutting element 20 away from a vertical position which will cause the edge 56 of the cut sheet metal to become slightly displaced from edge 58 in a vertical direction (FIG. 5). This tool is then removed, leaving a wider gap than the cut which was made by cutting element 20, allowing for easy insertion of a pair of tin snips.

It is also preferred that the guide plate 50 be generally of a circular disc configuration to minimize the number of sharp points on its lower surface which might catch or gouge the sheet 100.

An additional important feature of the circular guide disc of the preferred embodiment is that it contains a notch 54 cut through the entire thickness of the disc which extends radially from the point where the guide plate 50 intersects cutting edge 26 to the perimeter of the disc along a line lying in a vertical place of the cutting element 20. The notch 54 serves as a visual indicating slot for determining whether a cut has reached a particular area or marking on the sheet 100.

Additionally, burrs or other small surface imperfections are sometimes encountered on a sheet along the planned cutting path. Notch 54, which is preferably slightly wider than the width of cutting element 20, allows the tool 10 to be advanced substantially unimpeded along the cutting path, the burr passing between the edges of the notch 54. The cutting edge 26 will then either knock the imperfection off of the surface or will cut through it, allowing the tool 10 to continue cutting.

The fabrication of tool 10 can be accomplished several different ways. The preferred embodiment uses a unibody shaft and cutting element, that is, they are formed as one piece. The taper leading to the cutting edge may be accomplished by grinding from flat faces prior to attaching the guide plate 50 and striking block 40. These elements would then be joined to the cutting element 20 preferably by welding. Handle 12 can be press fitted onto shaft 14, or attached by other conventional means.

Although the foregoing description includes various details and particular structures according to the preferred embodiment of the invention, it is to be understood that these are for illustrative purposes only. Various modifications and adaptations will be apparent to those of ordinary skill in the art. Accordingly, the scope of the present invention should be determined by reference to the appended claims.

I claim:

1. A sheet metal cutting and punching tool comprising:
   a shaft;
   a handle attached to an upper end of said shaft;
   said shaft having a longitudinal axis and an elongated cutting portion at a lower end of said shaft, said cutting portion having a lower surface and an upper surface located on opposite sides of said longitudinal axis and a straight cutting edge extending from a tip on said cutting portion along the lower surface of said portion;
   guide means disposed on said cutting portion at a predetermined distance from said tip for guiding said cutting tool, said guide means having a substantially planar surface on a lower side thereof which intersects said longitudinal axis, said guide means being oriented at an oblique angle to said cutting edge wherein said planar surface and said cutting edge intersect forming an obtuse angle; and
   a striking block disposed on said cutting portion along said longitudinal axis between said upper end of said shaft and said intersection of said guide means with said longitudinal axis and projecting from the upper surface thereof, said striking block having a substantially flat striking face.

2. The sheet metal tool of claim 1 wherein the lower planar surface of said guide means has a relatively large surface area for distribution of impact forces.

3. The sheet metal tool of claim 2 wherein said guide means is a guide plate having a substantially planar surface on a top side parallel to said planar surface on said lower side.

4. The sheet metal tool of claim 3 wherein the guide plate has a circular configuration forming a disc.

5. The sheet metal tool of claim 4 wherein said guide disc contains a notch extending radially from a point adjacent to said cutting edge to the perimeter of said disc along a line lying in a plane aligned with said longitudinal axis and passing through said lower and upper surfaces of said cutting portion.

6. The sheet metal tool of claim 1 wherein the shaft, the handle, and the cutting portion have a common longitudinal axis.

7. The sheet metal tool of claim 6 wherein said lower and upper surfaces of said cutting portion lie in a plane which is aligned with said longitudinal axis and which is substantially perpendicular to the planar surface on the lower side of said guide means.

8. The sheet metal tool of claim 7 wherein said striking block projects from said cutting portion perpendicularly to said longitudinal axis.

9. The sheet metal tool of claim 8 wherein the striking face of said striking block lies in a plane which is orthogonal to said plane containing said lower and upper surfaces of said cutting portion, said plane of said striking face further being parallel to said longitudinal axis.

10. The sheet metal tool of claim 9 wherein the lower planar surface of said guide means has a relatively large surface area for distribution of impact forces.

11. The sheet metal tool of claim 10 wherein said guide means is a guide plate having a substantially planar surface on a top side parallel to said planar surface on said lower side.

12. The sheet metal tool of claim 11 wherein the guide plate has a circular configuration forming a disc.

13. The sheet metal tool of claim 12 wherein said disc contains a notch extending radially from the point adjacent to said cutting edge to the perimeter of said disc.

14. The sheet metal tool of claim 13 wherein said notch extends from said cutting edge to said perimeter along a line disposed in said plane containing said lower and upper surfaces of said cutting portion.

15. The sheet metal tool of claim 1 wherein said striking block includes a substantially cylindrical portion extending from the upper surface of said cutting portion.

16. The sheet metal tool of claim 15 wherein said striking face is circular.

17. The sheet metal tool of claim 15 wherein said block has a large mass relative to the cutting portion for absorption of impact blows to its striking face.

18. A sheet metal cutting and punching tool comprising:
   an elongated shaft having a longitudinal axis;
   a handle attached to an upper end of said shaft;
   said shaft having an elongated cutting portion at a lower end of said shaft, said cutting portion having a lower surface and an upper surface located on opposite sides of said longitudinal axis and a straight cutting edge extending from a tip of said cutting portion along the lower surface of said cutting portion;
   guide means disposed on said cutting portion at a predetermined distance from said tip for guiding said cutting tool, said guide means having a substantially planar surface on a lower side thereof which intersects said longitudinal axis, said guide means being oriented at an oblique angle to said cutting edge wherein said planar surface and cutting edge intersect forming an obtuse angle;
   said lower planar surface of said guide means having a relatively large lateral surface area; and
   a striking block disposed on said cutting portion along said longitudinal axis between said upper end of said shaft and said intersection of said guide means with said longitudinal axis and projecting from the upper surface thereof, said striking block having a substantially flat striking face, wherein said striking block projects from said cutting portion perpendicularly to said longitudinal axis, and wherein said striking face lies in a plane which is orthogonal to a plane aligned with said longitudinal axis and passing through said lower and upper surfaces of said cutting portion, said plane of said striking face further being parallel to said longitudinal axis.

* * * * *